United States Patent
Yamashita et al.

(10) Patent No.: US 11,926,883 B2
(45) Date of Patent: Mar. 12, 2024

(54) METHOD FOR RECOVERING VALUABLE METAL

(71) Applicant: SUMITOMO METAL MINING CO., LTD., Tokyo (JP)

(72) Inventors: Yu Yamashita, Niihama (JP); Toshihiko Nagakura, Niihama (JP); Tomoya Hagio, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 18/014,200

(22) PCT Filed: Jun. 29, 2021

(86) PCT No.: PCT/JP2021/024638
§ 371 (c)(1),
(2) Date: Jan. 3, 2023

(87) PCT Pub. No.: WO2022/009742
PCT Pub. Date: Jan. 13, 2022

(65) Prior Publication Data
US 2023/0257851 A1    Aug. 17, 2023

(30) Foreign Application Priority Data

Jul. 9, 2020   (JP) ................ 2020-118450

(51) Int. Cl.
*C22B 7/00* (2006.01)
*C22B 1/00* (2006.01)
*C22B 15/00* (2006.01)
*C22B 23/02* (2006.01)
*H01M 10/54* (2006.01)

(52) U.S. Cl.
CPC ............. *C22B 7/001* (2013.01); *C22B 1/005* (2013.01); *C22B 15/0056* (2013.01); *C22B 23/02* (2013.01); *H01M 10/54* (2013.01)

(58) Field of Classification Search
CPC ..... C22B 7/001; C22B 1/005; C22B 15/0056; C22B 23/02; C22B 7/00; C22B 15/00;
(Continued)

(56) References Cited

U.S. PATENT DOCUMENTS

2014/0174256 A1*  6/2014  Takahashi ............... C22B 1/005
                                                                75/414
2021/0328283 A1   10/2021  Yamashita et al.

FOREIGN PATENT DOCUMENTS

CN   101252186 A  *  8/2008
CN   103380218 A  * 10/2013  ............. C22B 1/005
(Continued)

OTHER PUBLICATIONS

Danczak, Anna et al, Behavior of Battery Metals Lithium, Cobalt, Manganese, and Lanthanum in Black Copper Smelting, Batteries, Mar. 2, 2020 (Year: 2020).*
(Continued)

*Primary Examiner* — Brian D Walck
*Assistant Examiner* — Danielle Carda
(74) *Attorney, Agent, or Firm* — Locke Lord LLP; James E. Armstrong, IV; Nicholas J. DiCeglie, Jr.

(57) ABSTRACT

Provided is a method which allows for strict control of an oxygen partial pressure required for the heating and melting of a raw material, and thereby more efficient recovery of a valuable metal. The method for recovering a valuable metal (Cu, Ni, and Co) includes the steps of: preparing a charge comprising at least phosphorus (P) and a valuable metal as a raw material; heating and melting the raw material to form a molten body and then converting the molten body into a molten product comprising an alloy and a slag; and separating the slag from the molten product to recover the alloy comprising the valuable metal, wherein the heating and melting of the raw material comprises directly measuring an
(Continued)

oxygen partial pressure in the molten body using an oxygen analyzer, and regulating the oxygen partial pressure based on the obtained measurement result.

14 Claims, 1 Drawing Sheet

(58) Field of Classification Search
CPC .. C22B 7/004; C22B 1/02; C22B 5/10; C22B 5/12; C22B 7/005; C22B 23/005; H01M 10/54; B09B 3/70; B09B 3/40; B09B 2101/16; B09B 3/00; Y02P 10/20; Y02W 30/84; Y02W 30/20; Y02W 30/82
USPC .......................................................... 75/384
See application file for complete search history.

(56) References Cited

FOREIGN PATENT DOCUMENTS

| CN | 103380218 A | 10/2013 |
|---|---|---|
| EP | 3269832 A1 | 1/2018 |
| JP | S61-261445 A | 11/1986 |
| JP | H08-013052 A | 1/1996 |
| JP | 2003-160819 A | 6/2003 |
| JP | 2009-041052 A | 2/2009 |
| JP | 2012-172169 A | 9/2012 |
| JP | 2013-064177 A | 4/2013 |
| JP | 5853585 B2 | 2/2016 |
| JP | 2017-526820 A | 9/2017 |
| JP | 6542354 B2 | 7/2019 |
| JP | 2019-135321 A | 8/2019 |
| KR | 10-2007-0046990 A | 5/2007 |
| KR | 10-2013-0114723 A | 10/2013 |
| WO | 2016/023778 A1 | 2/2016 |
| WO | 2020/013294 A1 | 1/2020 |

OTHER PUBLICATIONS

CN-101252186-A Translation (Year: 2008).*
Danczak, Anna et al, "Behavior of Battery Metals Lithium, Cobalt, Manganese, and Lanthanum in Black Copper Smelting," Batteries, Mar. 2, 2020, pp. 1-17. (cited in the May 22, 2023 OA issued for U.S. Appl. No. 18/014,193).

* cited by examiner

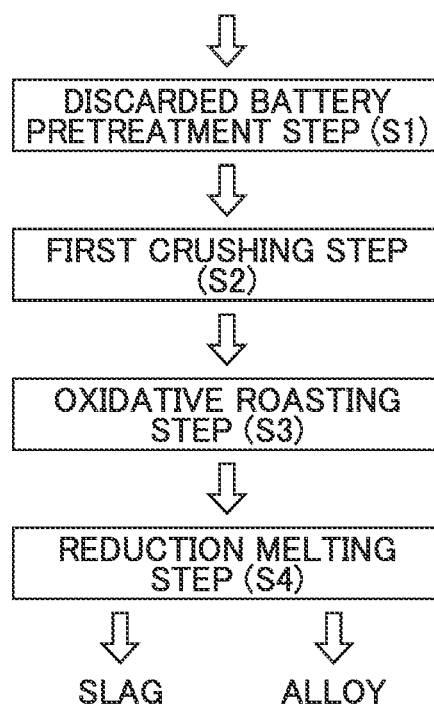

METHOD FOR RECOVERING VALUABLE METAL

CROSS REFERENCE TO RELATED APPLICATIONS

This application is related to two co-pending applications: "METHOD FOR RECOVERING VALUABLE METAL" filed even date herewith in the name of Yu Yamashita as a national phase entry of PCT/JP2021/023471; and METHOD FOR RECOVERING VALUABLE METAL" filed even date herewith in the name of Yu Yamashita as a national phase entry of PCT/JP2021/023472; which applications are assigned to the assignee of the present application and all three incorporated by reference herein.

TECHNICAL FIELD

The present invention relates to a method for recovering a valuable metal.

BACKGROUND ART

In recent years, lithium ion batteries are in widespread use as a lightweight and high-power battery. Well-known lithium ion batteries have a structure in which a negative electrode material, a positive electrode material, a separator, and an electrolyte solution are encapsulated in an outer case. In this regard, the outer case is made from a metal such as iron (Fe) and aluminum (Al). The negative electrode material comprises a negative electrode active material (graphite, etc.) bonded to a negative electrode current collector (a copper foil, etc.). The positive electrode material comprises a positive electrode active material (lithium nickelate, lithium cobaltate, etc.) bonded to a positive electrode current collector (an aluminum foil, etc.). The separator comprises, for example, a porous polypropylene resin film. The electrolyte solution comprises an electrolyte such as lithium hexafluorophosphate ($LiPF_6$).

One of the major applications of the lithium ion batteries is hybrid motor vehicles and electric motor vehicles. Thus, a huge number of lithium ion batteries now installed in the motor vehicles are expected to be discarded in the future according to the life cycle of the motor vehicles. In addition, there exist lithium ion batteries which are discarded as a defective product in the production process. Recycling of such spent batteries and the defective batteries generated in the production process (hereinafter, "discarded lithium ion battery") as a resource is needed.

A pyrometallurgy process involving entirely fusing the discarded lithium ion batteries in a high temperature furnace (melting furnace) has been conventionally proposed as a procedure for the recycling. The pyrometallurgy process includes melting crushed discarded lithium ion batteries, and separating and recovering a valuable metal typified by cobalt (Co), nickel (Ni) and copper (Cu), which is a target for recovery, from a low-value-added metal typified by iron (Fe) and aluminum (Al) by utilizing the difference in oxygen affinity therebetween. In this procedure, the low-value-added metal is oxidized as much as possible to form a slag, whereas the valuable metal is inhibited from oxidation as much as possible and recovered as an alloy.

In such a pyrometallurgy process involving separating and recovering the valuable metal by utilizing the difference in oxygen affinity, the control of the degree of oxidation and reduction in the melting treatment is crucial. In other words, an inadequate control may cause a problem that the alloy which should be recovered as the valuable metal is contaminated with an impurity, or that an oxidized valuable metal is trapped in the slag which should be recovered as an impurity; the problem leads to a decrease in the recovery ratio of the valuable metal. Therefore, the pyrometallurgy process has conventionally employed the introduction of an oxidant such as air and oxygen, or a reductant to a melting furnace to control the degree of oxidation and reduction.

For example, Patent Document 1 relates to a process for separating cobalt from lithium present in charges containing a lithium ion battery or a battery scrap, and discloses that the regulation of an oxygen input into a bath to achieve a target oxygen pressure of $10^{-18}$ to $10^{-14}$ atm is preferable, and that the upper limit ($10^{-14}$ atm) helps the elimination of the formation and loss of cobalt oxides in a slag, and the lower limit ($10^{-18}$ atm) ensures the oxidation of elements such as aluminum and carbon (see claim 1 and paragraph in Patent Document 1).

Patent Document 2 relates to a method for recovering a valuable metal from a discarded lithium ion battery containing nickel and cobalt, and discloses that the adjustment of an oxygen amount, an oxidation time and temperature in a preliminary oxidation step, etc. allows for the strict adjustment of the degree of oxidation, that the adjustment of the degree of oxidation allows for the separation of an almost total amount of aluminum oxide as a slag in a slag separation step, that an additional oxidation treatment is performed for an infinitesimal time in a melting step, and that the additional oxidation step allows for more finer adjustment of an appropriate degree of oxidation (see claim 1, and paragraphs [0033] and [0036] in Patent Document 2).

Patent Document 1: Japanese Patent No. 6542354
Patent Document 2: Japanese Patent No. 5853585

DISCLOSURE OF THE INVENTION

Problems to be Solved by the Invention

While the introduction of air or oxygen in the melting treatment to control the degree of oxidation and reduction has been proposed for the valuable metal recovery in the pyrometallurgy process, as described above, there has been room for further improvement in the procedure. Specifically, stricter control of the degree of oxidation and reduction (an oxygen partial pressure) is important for efficient recovery of the valuable metal.

For example, the discarded lithium ion battery contains a large amount of impurities such as carbon (C), aluminum (Al), fluorine (F) and phosphorus (P). In addition, in recent years, some lithium ion batteries have a minor amount of tungsten (W), niobium (Nb), zirconium (Zr), or the like added to a positive electrode active material for improving their performance such as charging and discharging characteristics and cycling characteristics, and some lithium ion batteries contain chromium (Cr) originating from a steel use stainless material used for an outer case.

Among these elements, phosphorus, tungsten and chromium, which are each an impurity element, are reduced relatively easily. Therefore, the absence of strict control of the degree of oxidation and reduction may lead to the contamination of an alloy which is supposed to be recovered as a valuable metal with the impurity element such as phosphorus. On the other hand, if the degree of reduction is excessively low, a valuable metal, in particular, cobalt, is likely to be oxidized, which makes the recovery of the valuable metal as an alloy impossible.

From this viewpoint, the conventionally-proposed procedures insufficiently control the degree of oxidation and reduction (the oxygen partial pressure). For example, in Patent Document 1, the material balance of Cu, Ni, Fe, Co, Al, Si, and Ca is examined (Table 1 in Patent Document 1), but the contamination of the alloy with phosphorus is not recognized. In addition, in Patent Document 1, an oxidation level ($PO_2$) is determined by directly analyzing a gas over a melting bath (paragraph [0022] in Patent Document 1), but such a procedure causes difficulties in accurately measuring and controlling an oxygen partial pressure. Thus, the procedure disclosed in Patent Document 1 has a problem, in particular, in that the incorporation of phosphorus into the alloy cannot be prevented. Actual examination by the present inventors revealed that the alloy is likely to be contaminated with phosphorus under an oxygen partial pressure condition of less than $10^{-14}$ atm, which is proposed to be preferable in Patent Document 1.

The method proposed in Patent Document 2 includes an additional dephosphorization step after a melting step and a slag separation step, and this dephosphorization step is intended for the separation of phosphorus from the alloy (claim 1 and paragraphs [0039] to [0046] in Patent Document 2). Such a procedure enables phosphorus to be removed; however, a process which eliminates the dephosphorization step but can remove phosphorus is desirable for further reduction of production costs. A solution for the realization of such a process is not disclosed in Patent Document 2. In addition, the contamination with impurity elements such as phosphorus, as well as tungsten and chromium is not recognized in Patent Document 2.

It should be noted that as a method for removing tungsten in an alloy, a method involving dissolving the alloy using an acid or the like, and subsequently removing tungsten through a neutralization procedure is known, for example; this method allows for the removal of tungsten, but has problems of the use of a neutralizing agent, and the coprecipitation of a valuable metal such as nickel and cobalt together with tungsten during the neutralization treatment, leading to a concern with a drastic increase in production costs. In addition, in the case of the alloy being contaminated with chromium, for example, chromium in the alloy reacts with oxygen in ambient air upon crushing of the alloy, to form an oxide containing chromium as a principal component and having a high melting point, which may interfere with the production and decrease the production efficiency.

The present inventors conducted extensive studies in view of such circumstances. Consequently, the present inventors found that an oxygen partial pressure can be strictly controlled by directly measuring the oxygen partial pressure in a molten product using an oxygen analyzer in the melting of a raw material and regulating the oxygen partial pressure based on the obtained measurement result, and this allows for prevention of the oxidation of a valuable metal concurrently with suppression of the incorporation of phosphorus, tungsten and chromium into the alloy, and consequently for more efficient recovery of the valuable metal.

The present invention was completed based on such findings, and it is an object of the present invention to provide a method which allows for strict control of an oxygen partial pressure required for the heating and melting of a raw material, and thereby more efficient recovery of a valuable metal.

Means for Solving the Problems

The present invention encompasses the following first to sixth aspects. It should be noted that in the present description, any numerical range specified using "to" refers to a range including the upper and lower limits of the range. In other words, the expression "X to Y" has the same meaning as "X or more and Y or less".

A first aspect of the present invention provides a method for recovering a valuable metal, comprising the steps of: preparing a charge comprising at least phosphorus (P) and a valuable metal as a raw material; heating and melting the raw material to form a molten body and then converting the molten body into a molten product comprising an alloy and a slag; and separating the slag from the molten product to recover the alloy comprising the valuable metal, wherein the heating and melting of the raw material comprises directly measuring an oxygen partial pressure in the molten body using an oxygen analyzer, and regulating the oxygen partial pressure based on the obtained measurement result.

A second aspect of the present invention provides the method according to the first aspect, wherein the charge further comprises at least one element of tungsten (W) and chromium (Cr).

A third aspect of the present invention provides the method according to the first or second aspect, wherein the oxygen partial pressure is regulated within the range of $10^{-14.0}$ (atm) or higher and $10^{-8.0}$ (atm) or lower.

A fourth aspect of the present invention provides the method according to any one of the first to third aspects, wherein the oxygen partial pressure is regulated within the range of $10^{-14.0}$ (atm) or higher and $10^{-11.0}$ (atm) or lower.

A fifth aspect of the present invention provides the method according to any one of the first to fourth aspects, wherein the heating temperature in the heating and melting of the raw material is 1,300° C. or higher and 1,500° C. or lower.

A sixth aspect of the present invention provides the method according to any one of the first to fifth aspects, wherein the valuable metal comprises at least one metal selected from the group consisting of copper (Cu), nickel (Ni), cobalt (Co) and a combination thereof, or an alloy comprising at least one metal selected from the group consisting of copper (Cu), nickel (Ni), cobalt (Co) and a combination thereof.

A seventh aspect of the present invention provides the method according to any one of the first to sixth aspects, wherein the charge comprises a discarded lithium ion battery.

Effects of the Invention

The present invention provides a method which allows for strict control of an oxygen partial pressure in the heating and melting of a raw material, and thereby more efficient recovery of a valuable metal.

BRIEF DESCRIPTION OF THE DRAWINGS

FIG. 1 shows one example of a recovery method of a valuable metal.

PREFERRED MODE FOR CARRYING OUT THE INVENTION

A specific embodiment of the present invention (hereinafter, referred to as "the present embodiment") will be described. It should be noted that the present invention is not limited to the following embodiments, and various modifications are possible without departing from the spirit of the present invention.

A method for recovering a valuable metal according to the present embodiment includes the steps of: preparing a charge containing at least phosphorus (P) and a valuable metal as a raw material (preparation step); heating and melting the prepared raw material to form a molten body and then converting the molten body into a molten product containing an alloy and a slag (melting step); and separating the slag from the obtained molten product to recover the alloy containing the valuable metal step (slag separation step). In addition, in the heating and melting of the raw material, an oxygen partial pressure in the molten body is directly measured using an oxygen analyzer, and the oxygen partial pressure is regulated based on the obtained measurement result.

The method according to the present embodiment is for recovering a valuable metal from the charge containing at least phosphorus (P) and a valuable metal. The charge may further contain at least one of tungsten (W) and chromium (Cr). As used herein, the valuable metal is a target for the recovery, and is, for example, at least one metal selected from the group consisting of copper (Cu), nickel (Ni), cobalt (Co) and a combination thereof, or an alloy containing at least one metal selected from the group consisting of copper (Cu), nickel (Ni), cobalt (Co) and a combination thereof. The present embodiment is a recovery method principally through a pyrometallurgy process. The present embodiment, however, may involve the pyrometallurgy process and a hydrometallurgy process. Each step will be described in detail below.

<Preparation Step>

In the method according to the present embodiment, a charge is prepared to obtain a raw material in the preparation step. The charge is a target for the treatment for the recovery of a valuable metal, and contains, in addition to phosphorus (P), at least one valuable metal selected from the group consisting of copper (Cu), nickel (Ni), cobalt (Co) and a combination thereof. Moreover, the charge may further contain at least one of tungsten (W) and chromium (Cr) as an impurity element other than phosphorus, as described above. The charge may contain the component in the form of a metal or an element, or in the form of a compound such as an oxide. Further, the charge may contain an inorganic or organic component other than the component mentioned above.

The source of the charge is not particularly limited. Examples of the charge include a discarded lithium ion battery, as well as an electronic component or device that contains a dielectric or magnetic material. In addition, the form of the charge is not limited so long as it is suitable for the treatments in the subsequent steps. Further, in the preparation step, the charge may be subjected to a treatment such as a crushing treatment to achieve a suitable form for the treatments. Furthermore, in the preparation step, the charge may be subjected to a treatment such as a thermal treatment and/or a fractionation treatment to remove unwanted components such as moisture and organic matter.

<Melting Step>

In the method according to the present embodiment, the prepared raw material is subjected to a heating and melting treatment to separate the prepared raw material into an alloy (metal) and a slag in the melting step. Specifically, the raw material is heated and melted to form a molten body. The molten body contains the alloy and the slag in a molten state. Then, the resulting molten body is converted into a molten product. The molten product contains the alloy and the slag in a solidified state. The alloy principally contains the valuable metal. Thus, the valuable metal and other components can be separated as the alloy and the slag, respectively.

This arises from the fact that the low-value-added metal (Al, etc.) has high oxygen affinity, whereas the valuable metal has low oxygen affinity. For example, aluminum (Al), lithium (Li), carbon (C), manganese (Mn), phosphorus (P), tungsten (W), chromium (Cr), iron (Fe), cobalt (Co), nickel (Ni) and copper (Cu) are generally oxidized more easily in the order of: Al>Li>C>Mn>P>W>Cr>Fe>Co>Ni>Cu. In other words, aluminum (Al) is oxidized most easily, and copper (Cu) is most resistant to oxidation. Thus, the low-value-added metal (Al, etc.) is easily oxidized to form a slag, whereas the valuable metal (Cu, Ni, and Co) is reduced to form a metal (alloy). In this way, the low-value-added metal and the valuable metal can be separated into the slag and the alloy.

In the method according to the present embodiment, in the heating and melting of the raw material, an oxygen partial pressure in the molten body is directly measured using an oxygen analyzer, and the oxygen partial pressure is regulated based on the obtained measurement result. This enables the degree of oxidation and reduction of the molten body to be controlled strictly, resulting accurate separation of the valuable metal and impurities. By way of explanation of this point, it is in principle possible to control the degree of oxidation and reduction of the molten body simply by adjusting the amount of the blended components at the time of the raw material blending, if the degree of oxidation and reduction of the raw material (carbon amount, as well as the oxidation number and amount of the metal) is accurately known beforehand. Practically, however, the raw material is not uniform. A sampling error often occurs in the analysis of the raw material, and this error makes it difficult to control the degree of oxidation and reduction toward a target value.

Incidentally, Patent Document 1 proposes a procedure involving the analysis of a gas above a melting bath. However, such a procedure produces a large error in the measurement and is considered to be unreliable. More specifically, the oxygen partial pressure in the interior of the melting furnace where oxygen is being introduced is not in an equilibrium state, but fluctuates constantly. Thus, the oxygen partial pressure greatly varies from place to place and over time. Additionally, when an atmosphere gas contains dust, the dust may adhere to a probe of the gas analyzer to interfere with accurate measurements. Therefore, the procedure involving the analysis of the gas above the melting bath has difficulty accurately determining the degree of oxidation and reduction of the molten body (the oxygen partial pressure).

In contrast, the method according to the present embodiment directly measures the oxygen partial pressure of the molten body, and therefore the measurement value obtained thus accurately reflects the actual degree of oxidation and reduction of the molten body. Thus, when the degree of oxidation and reduction of the molten body is away from the target value, the oxygen partial pressure can be controlled by introducing a reductant or an oxidant, and thereby the degree of oxidation and reduction of the molten body can be accurately brought into line with the target value.

Consequently, even in the case where elements having similar oxygen affinity, e.g., cobalt as well as impurity elements such as phosphorus, tungsten and chromium, are contained in the molten body, these elements can be accurately separated.

The procedure for measuring the oxygen partial pressure in the molten body is not particularly limited. For example, a procedure can be mentioned in which an oxygen analyzer connected to an oxygen sensor (oxygen probe) is used and the sensor is inserted into the molten body such that the tip of the oxygen sensor is immersed in the molten body. A known sensor such as a zirconia solid electrolyte sensor may be used as the oxygen sensor. The procedure for measuring the oxygen partial pressure in the molten body is not limited so long as the oxygen partial pressure in the molten body can be directly measured.

The control of the oxygen partial pressure may be performed according to any known procedure. For example, the introduction of a reductant and/or an oxidant to the raw material and/or the molten body formed by melting the raw material may be mentioned. High-carbon-grade materials (graphite powder, graphite grains, coal, coke, etc.) and carbon monoxide may be used as the reductant. A high-carbon-grade component in the raw material may also be used as the reductant. Oxidizing gases (air, oxygen, etc.) and low-carbon-grade materials may be used as the oxidant. A low-carbon-grade component in the raw material may also be used as the oxidant.

The introduction of the reductant and the oxidant may also be performed according to any known procedure. When the reductant and the oxidant are a solid substance, they may be charged into the raw material and/or the molten body. When the reductant and the oxidant are a gaseous substance, they may be introduced from a feed port such as a lance installed in the melting furnace. Also, the timing of the introduction of the reductant and the oxidant is not limited. The reductant and the oxidant may be introduced simultaneously with the charging of the raw material into the melting furnace, or the reductant and the oxidant may be introduced at a stage when the raw material is melted and the molten body is formed. Suitably, the reductant and the oxidant are introduced into the melting furnace simultaneously with the raw material, the oxygen partial pressure in the molten body is measured at a stage when the raw material is melted and the molten body is formed, and whether the reductant and/or the oxidant is additionally introduced is determined based on the obtained result. When a measurement of the oxygen partial pressure is away from the target value, the reductant and/or the oxidant may be additionally introduced, whereas when the measurement is close to the target value, the additional introduction is not necessary.

It is preferable that in the heating and melting of the raw material, the oxygen partial pressure in the molten body is controlled within the range of $10^{-14.0}$ (atm) or higher and $10^{-8.0}$ (atm) or lower. This makes it possible to recover the valuable metal even further efficiently. When the oxygen partial pressure is less than $10^{-14.0}$ (atm), the degree of reduction of the molten body is so high that the impurities, i.e., phosphorus, tungsten, and chromium may be reduced and the alloy may be contaminated therewith. On the other hand, when the oxygen partial pressure is $10^{-8.0}$ (atm) or higher, cobalt being a valuable metal may be oxidized and trapped in the slag. More suitably, the oxygen partial pressure is regulated within the range of $10^{-14.0}$ (atm) or higher and $10^{-11.0}$ (atm) or lower.

A flux may be introduced (added) to the raw material during the heating and melting treatment in the melting step. The addition of the flux can result in a decrease in the temperature in the melting treatment, and even further facilitate the removal of the impurity element such as phosphorus, tungsten and chromium. The flux preferably contains an element that traps the impurity element to form a basic oxide having a low melting point. For example, phosphorus is, when oxidized, converted to an acidic oxide; hence, the more basic the slag formed in the melting step is, the more readily phosphorus becomes trapped in the slag and removed. Among such substances, those which contain a calcium compound that is inexpensive and stable at ambient temperature are more preferable. Examples of the calcium compound include calcium oxide (CaO) and calcium carbonate ($CaCO_3$).

The heating temperature in the heating and melting of the raw material is not particularly limited, and is preferably 1,300° C. or higher and 1,500° C. or lower. When the heating temperature is 1,300° C. or higher, the valuable metal (Cu, Co, and Ni) is sufficiently melted, and forms an alloy under the condition of increased fluidity. Thus, efficient separation of the alloy from the slag can be achieved in the slag separation step, as described later. The heating temperature is more preferably 1,350° C. or higher. On the other hand, when the heating temperature is higher than 1,500° C., thermal energy is wastefully consumed, and a crucible and a refractory material such as a furnace wall are consumed severely, which may result in a decrease in productivity. Further, the heating temperature is more preferably 1,450° C. or lower.

<Preliminary Heating Step>

The step of preliminarily heating (oxidatively roasting) the raw material to be subjected to the treatment of heating and melting to obtain a preliminarily heated product (oxidatively roasted product) (preliminary heating step) may be included before the melting step, as needed. In the preliminary heating step (oxidative roasting step), the raw material is preliminarily heated to reduce the amount of carbon contained in the raw material. Even in the case where the raw material (charge, etc.) contains an excess amount of carbon, such a preliminary heating step enables the excess carbon to be oxidized and removed, thereby promoting the integration of the valuable metal into the alloy in the subsequent melting step.

More specifically, the valuable metal is reduced to form localized molten fine particles in the melting step, and the carbon in the raw material may be a physical obstacle in the aggregation of the molten fine particles (valuable metal). Therefore, when the preliminary heating step is absent, the carbon may interfere with the aggregation and integration of the molten fine particles and the resulting separation of the alloy (metal) from the slag, leading to a decrease in the recovery ratio of the valuable metal. In contrast, when the carbon is removed beforehand in the preliminary heating step, the aggregation and integration of the molten fine particles (valuable metal) proceeds in the melting step, and the recovery ratio of the valuable metal can be even further increased. Further, since phosphorus (P), tungsten (W), and chromium (Cr) are impurity elements which are relatively easily reduced, the presence of an excess amount of carbon may lead to the reduction of phosphorus and trapping of phosphorus in the alloy together with the valuable metal. In this regard, when the preliminary heating step is performed and the excess amount of carbon is removed beforehand, the contamination of the alloy with the impurity element such as phosphorus can be prevented. In addition, the carbon amount in the preliminarily heated product is preferably less than 1% by mass.

Furthermore, when the preliminary heating step is performed, variations in oxidation can be suppressed. In the preliminary heating step, it is desirable to perform the treatment (oxidative roasting) to such a degree of oxidation that the low-value-added metal (Al, etc.) contained in the raw material (charge, etc.) can be oxidized. On the other hand, the degree of oxidation is easily controlled by adjusting the temperature, time and/or atmosphere of the treatment in the preliminary heating. Thus, the preliminary heating step allows for stricter adjustment of the degree of oxidation, and the suppression of the variations in oxidation.

The adjustment of the degree of oxidation is performed as follows. As described above, aluminum (Al), lithium (Li), carbon (C), manganese (Mn), phosphorus (P), tungsten (W), chromium (Cr), iron (Fe), cobalt (Co), nickel (Ni) and copper (Cu) are generally oxidized in the order of: Al>Li>C>Mn>P>W>Cr>Fe>Co>Ni>Cu. In the preliminary heating step, the oxidation is continued until the total amount of aluminum (Al) is oxidized. The oxidation may be promoted until a fraction of iron (Fe) is oxidized, but the degree of oxidation is kept to such an extent that the oxidation of cobalt (Co) and the distribution thereof to the slag is avoided.

The preliminary heating is preferably performed in the presence of an oxidant. The preliminary heating in the presence of the oxidant makes it possible to efficiently achieve the oxidation and removal of carbon (C) as an impurity and the oxidation of aluminum (Al). The oxidant is not particularly limited, and an oxygen-containing gas (air, pure oxygen, oxygen-enriched gas, etc.) is preferable in light of its ease of handling. The amount of the oxidant introduced is preferably about 1.2 times the chemical equivalent required for the oxidation of each substance to be oxidatively treated, for example.

The heating temperature in the preliminary heating is preferably 700° C. or higher and 1,100° C. or lower. When the temperature in the preliminary heating is 700° C. or higher, the efficiency of the oxidation of carbon can be even further increased, and the oxidation time can be reduced. Further, when the temperature in the preliminary heating is 1,100° C. or lower, thermal energy costs can be limited, and the efficiency of the preliminary heating can be enhanced.

The temperature in the preliminary heating may be 800° C. or higher. Moreover, the temperature in the preliminary heating may be 900° C. or lower.

The preliminary heating treatment in the preliminary heating step can be performed using any known roasting furnace. Further, it is preferable to use a furnace (preliminary furnace) different from the melting furnace used in the treatment in the subsequent melting step, and perform the preliminary heating treatment in the preliminary furnace. A furnace of any design may be used as the preliminary furnace so long as the furnace permits the oxidant (oxygen, etc.) to be fed while roasting the charge and the oxidation treatment to be performed inside the furnace. Examples of such a furnace include a rotary kiln, and a tunnel kiln (hearth furnace), which are conventionally known.

<Slag Separation Step>

In the slag separation step, the slag is separated from the molten product obtained in the melting step to recover the alloy containing the valuable metal. The slag and the alloy differ in specific gravity. Thus, the slag having a lower specific gravity than the alloy accumulates over the alloy, and the separation and recovery can be easily achieved through the separation based on the specific gravity.

The slag separation step may be followed by the sulfurization step of sulfurizing the obtained alloy, and the crushing step of crushing the resulting sulfide or the alloy. Furthermore, the valuable metal alloy obtained after such a pyrometallurgy process may be subjected to a hydrometallurgy process. The hydrometallurgy process makes it possible to remove the impurity components, to separate and purify the valuable metal (Cu, Ni, and Co), and to recover each valuable metal. Examples of treatments in the hydrometallurgy process include known procedures such as a neutralization treatment and a solvent extraction treatment.

According to the method according to the present embodiment as described above, the oxygen partial pressure of the molten body can be strictly controlled, and thereby the incorporation of the impurity elements such as phosphorus, tungsten, and chromium into the alloy can be suppressed while preventing the oxidation of a valuable metal. Consequently, the valuable metals can be recovered more efficiently. For example, the phosphorus content in the alloy (the phosphorus grade in the metal) can be reduced to 0.50% by mass or less, 0.10% by mass or less, 0.05% by mass or less, 0.03% by mass or less, or 0.01% by mass or less. In addition, the tungsten content in the alloy (the tungsten grade in the metal) can be reduced to 0.20% by mass or less, 0.02% by mass or less, or 0.01% by mass or less. Further, the chromium content in the alloy (the chromium grade in the metal) can be reduced to 0.05% by mass or less, 0.03% by mass or less, 0.01% by mass or less.

Furthermore, the recovery ratio of the valuable metal can be increased to 90.0% by mass or more, 95.0% by mass or more, 97.0% by mass or more, 99.0% by mass or more, or 99.5% by mass or more. As used herein, the recovery ratio of the valuable metal is calculated using the content of the valuable metal in the finally obtained alloy and slag according to the equation (1) below.

[Equation 1]

$$\text{Valuable metal recovery ratio}(\% \text{ by mass}) = \frac{\text{Content of valuable metal in alloy}}{\text{Content of valuable metal in alloy} + \text{Content of valuable metal in slag}} \times 100 \quad (1)$$

The charge of the present embodiment is not limited so long as the charge contains the valuable metal, and the charge preferably contains a discarded lithium ion battery. The discarded lithium ion battery contains lithium (Li) and a valuable metal (Cu, Ni, and Co), as well as a low-value-added metal (Al, Fe, P, W, and Cr) and carbon components. Therefore, the use of the discarded lithium ion battery as the charge allows for efficient separation and recovery of the valuable metals. It should be noted that the discarded lithium ion battery encompasses not only used lithium ion batteries but also waste materials in the production process of the lithium ion battery, e.g., defective products of components of the batteries, such as a positive electrode material and the like, which are generated in the production process, as well as residues and leavings inside the production process. As such, the discarded lithium ion battery may be referred to as lithium ion battery waste material.

A method for recovering a valuable metal from a discarded lithium ion battery will be described with reference to FIG. 1. FIG. 1 is a flowchart showing an example of the recovery method. As shown in FIG. 1, this method includes the steps of:

removing an electrolyte solution and an outer case of the discarded lithium ion battery to obtain discarded battery contents (discarded battery pretreatment step S1); crushing the discarded battery contents to obtain a crushed product (first crushing step S2); preliminarily heating the crushed product to obtain a preliminarily heated product (preliminary heating step S3); melting the preliminarily heated product to obtain a molten product (melting step S4); and separating a slag from the molten product to recover the alloy (slag separation step). In addition, the slag separation step may be followed by the sulfurization step of sulfurizing the obtained alloy, and the second crushing step of crushing the resulting sulfide or the alloy, although not shown in FIG. 1. In the following, each step will be described in detail.

<Discarded Battery Pretreatment Step>

The discarded battery pretreatment step (S1) is performed for the purpose of the explosion prevention and detoxification of the discarded lithium ion battery and the removal of the outer case. The lithium ion battery is produced in the form of a closed system, and contains the electrolyte solution and the like therein. Thus, a direct crushing treatment of the lithium ion battery is dangerous because of a risk of explosion. It is preferable to apply an electric discharge treatment and/or an electrolyte solution removal treatment to the lithium ion battery via any procedure. On the other hand, the outer case is often formed from aluminum (Al) or iron (Fe), which are metals, and such an outer case made from a metal is relatively easy to recover directly. Thus, the removal of the electrolyte solution and the outer case in the discarded battery pretreatment step (S1) leads to an increase in safety, and the increase in the recovery ratio of the valuable metal (Cu, Ni, and Co).

A specific method for the discarded battery pretreatment is not particularly limited. One exemplary procedure involves physically making a hole on the discarded battery with a needle-shaped cutting edge, and removing the electrolyte solution therethrough. An alternative procedure involves heating the discarded lithium ion battery and burning the electrolyte solution to achieve the detoxification.

In the case where aluminum (Al) and/or iron (Fe) contained in the outer case is recovered in the discarded battery pretreatment step (S1), the removed outer case may be crushed followed by sieving the crushed product with a sieve shaker. Since aluminum (Al) is readily crushed to a powder form by mild crushing, aluminum (Al) can be efficiently recovered. Iron (Fe) contained in the outer case may be recovered through magnetic selection.

<First Crushing Step>

In the first crushing step (S2), the discarded lithium ion battery contents are crushed to obtain a crushed product. This step is intended to enhance the reaction efficiency in a pyrometallurgy process. The enhancement of the reaction efficiency leads to the increase in the recovery ratio of the valuable metal (Cu, Ni, and Co). A specific crushing method is not particularly limited. Any conventionally known crusher such as a cutter mixer may be used for the crushing. Incidentally, the discarded battery pretreatment step and the first crushing step together correspond to the preparation step described above.

<Preliminary Heating Step>

In the preliminary heating step (oxidative roasting step) (S3), the crushed product obtained in the first crushing step (S2) is subjected to preliminary heating (oxidative roasting) to obtain a preliminarily heated product (oxidatively roasted product). Details of this step are as described above.

<Melting Step>

In the melting step (S4), the preliminarily heated product obtained in the preliminary heating step (S3) is melted to obtain a molten product. Details of this step are as described above.

<Slag Separation Step>

In the slag separation step, the slag is separated from the molten product obtained in the melting step (S4) to recover the alloy. Details of this step are as described above.

The slag separation step may be followed by a sulfurization step and a crushing step. Furthermore, the obtained alloy containing the valuable metal may be subjected to a hydrometallurgy process. Details of the sulfurization step, the crushing step and the hydrometallurgy process are as described above.

EXAMPLES

The present invention will be described in more detail with reference to the following Examples and Comparative Examples. However, the present invention is not limited to the following Examples.

(1) Recovery of Valuable Metals

Example 1

Valuable metals were recovered using a discarded lithium ion battery as a charge. The recovery was performed according to the following steps.

<Discarded Battery Pretreatment Step (Preparation Step)>

Used batteries, and defective products collected in a battery production process were provided as the discarded lithium ion battery. Then, the discarded lithium ion batteries were immersed altogether in salt water to permit discharging, followed by the removal of moisture. The discarded lithium ion batteries were roasted in ambient air at 260° C. to decompose and remove the electrolyte solution and the outer case, and thereby the battery contents were obtained. The composition of the principal elements of the battery contents was as shown in Table 1 below.

TABLE 1

| Composition of principal elements of discarded battery contents (% by mass) | | | | | | | |
|---|---|---|---|---|---|---|---|
| Copper | Nickel | Cobalt | Phosphorus | Tungsten | Chromium | Aluminum | Carbon |
| 18 | 22 | 4 | 0.4 | 0.1 | 0.02 | 5 | 25 |

<Crushing Step>

The obtained battery contents were crushed with a crusher (product name: Good Cutter, manufactured by Ujiie Manufacturing Co., Ltd.), and thus a crushed product was obtained.

<Preliminary Heating Step>

The crushed product obtained thus was charged into a rotary kiln, and was preliminary heated in ambient air at 800° C. for 180 minutes, to obtain a raw material to be subjected to heating and melting.

<Melting Step>

Calcium oxide (CaO) and silicon dioxide ($SiO_2$) were added as a flux to the preliminarily heated and crushed product (the raw material to be subjected to heating and melting), and graphite powder was further added thereto as a reductant, and these were mixed. The resulting mixture was charged into an alumina crucible, and heated and melted by resistive heating to a temperature of 1,400° C. to form a molten body. Subsequently, a molten product containing an alloy and a slag was obtained.

In the melting of the raw material, an oxygen partial pressure in the molten body is directly measured using an oxygen analyzer, and the oxygen partial pressure was controlled so as to achieve $10^{-13.9}$ (atm). Specifically, an oxygen analyzer equipped with an oxygen probe (Kawaso Electric Industrial Co. Ltd., OXT-O) on the tip thereof was used, and the probe was inserted into the molten body such that the tip of this oxygen probe was directly immersed in the molten body. This oxygen probe used has a zirconia solid electrolyte sensor. Then, a value of the measured oxygen partial pressure was read after the stabilization of the measured oxygen partial pressure. The control of the oxygen partial pressure was performed by adjusting the amount of a reductant (graphite powder) added.

<Slag Separation Step>

The slag was separated from the resulting molten product based on the difference in specific gravity, to recover the alloy.

Example 2

In the melting step, the amount of the reductant (graphite powder) added was changed, and the oxygen partial pressure was regulated to achieve $10^{-12.9}$ (atm). The recovery of the valuable metals was performed in otherwise the same manner as in Example 1.

Example 3

In the melting step, the amount of the reductant (graphite powder) added was changed, and the oxygen partial pressure was regulated to achieve $10^{-8.0}$ (atm). The recovery of the valuable metals was performed in otherwise the same manner as in Example 1.

Example 4

In the melting step, the amount of the reductant (graphite powder) added was changed, and the oxygen partial pressure was regulated to achieve $10^{-13.0}$ (atm). In addition, the heating temperature was 1,330° C. The recovery of the valuable metals was performed in otherwise the same manner as in Example 1.

Example 5

In the melting step, the amount of the reductant (graphite powder) added was changed, and the oxygen partial pressure was regulated to achieve $10^{-12.0}$ (atm). In addition, the heating temperature was 1,480° C. The recovery of the valuable metals was performed in otherwise the same manner as in Example 1.

Example 6

In the melting step, the amount of the reductant (graphite powder) added was changed, and the oxygen partial pressure was regulated to achieve $10^{-7.6}$ (atm). The recovery of the valuable metals was performed in otherwise the same manner as in Example 1.

Example 7

In the melting step, the amount of the reductant (graphite powder) added was changed, and the oxygen partial pressure was regulated to achieve $10^{-14.9}$ (atm). The recovery of the valuable metals was performed in otherwise the same manner as in Example 1.

(2) Evaluation

In Examples 1 to 7, elemental analysis was performed on the recovered alloy (metal) using an ICP analyzer (Agilent Technologies Japan, Ltd., Agilent 5100 SUDV). In this analysis, nickel (Ni), cobalt (Co) and copper (Cu), i.e., valuable metals, and phosphorus (P), tungsten (W), and chromium (Cr), i.e., impurities which are difficult to remove from the metal, were target elements for analysis.

Then, the content (% by mass) of phosphorus (P) in the alloy (metal) was designated as a phosphorus grade, the content (% by mass) of tungsten (W) in the alloy as a tungsten grade, and the content (% by mass) of chromium (Cr) in the alloy as a chromium grade. Further, the recovery ratio of the valuable metals was determined as follows. Specifically, the recovery ratio of the valuable metals was calculated according to the following formula (1) using the contents of the valuable metals (Cu, Ni, and Co) in the alloy and the slag, which were determined by elemental analysis.

[Equation 2]

$$\text{Valuable metal recovery ratio(\% by mass)} = \frac{\text{Content of valuable metal in alloy}}{\text{Content of valuable metal in alloy} + \text{Content of valuable metal in slag}} \times 100 \quad (1)$$

(3) Results

The resulting phosphorus grade, tungsten grade, and chromium grade as well as valuable metal recovery ratio for Examples 1 to 7 are shown in Table 2. As can be seen from the results in Table 2, the oxygen partial pressure of the molten body could be strictly regulated within the range of $10^{-14.9}$ to $10^{-7.6}$ (atm) by adjusting the amount of the reductant added and/or the heating temperature.

In addition, the alloy obtained in Examples 1 to 5 exhibits as high recovery ratio of the valuable metal contained in the batteries as 95% or more, and the resulting alloy had a phosphorus grade as low as less than 0.03% by mass, a tungsten grade as low as less than 0.01% by mass, and a chromium grade as low as less than 0.02% by mass. This demonstrated that the valuable metals could be obtained with a high recovery ratio and phosphorus, tungsten and chromium could be effectively removed. On the other hand, Example 6 resulted in a lower valuable metal recovery ratio, and Example 7 was unfavorable in terms of phosphorus grade, tungsten grade, and chromium grade.

TABLE 2

|  | Oxygen partial pressure (atm) | Reduction temperature (° C.) | Phosphorus grade in metal (% by mass) | Tungsten grade in metal (% by mass) | Chromium grade in metal (% by mass) | Valuable metal recovery ratio (%) |
| --- | --- | --- | --- | --- | --- | --- |
| Example1 | $10^{-13.9}$ | 1400 | 0.02 | 0.01 | 0.01 | 99.9 |
| Example2 | $10^{-12.9}$ | 1400 | <0.01 | <0.01 | >0.01 | 99.8 |
| Example3 | $10^{-8.0}$ | 1400 | <0.01 | <0.01 | <0.01 | 96.8 |
| Example4 | $10^{-13.0}$ | 1400 | <0.01 | <0.01 | <0.01 | 99.8 |
| Example5 | $10^{-12.0}$ | 1400 | <0.01 | <0.01 | <0.01 | 98.6 |
| Example6 | $10^{-7.6}$ | 1400 | <0.01 | <0.01 | <0.01 | 93.1 |
| Example7 | $10^{-14.9}$ | 1400 | 0.73 | 0.19 | 0.04 | 99.9 |

The invention claimed is:

1. A method for recovering a valuable metal comprising the steps of:
   preparing a charge comprising at least phosphorus (P) and a valuable metal as a raw material;
   heating and melting the raw material to form a molten body and then converting the molten body into a molten product comprising an alloy and a slag;
   separating the slag from the molten product to recover the alloy comprising the valuable metal,
   wherein the heating and melting of the raw material comprises directly measuring an oxygen partial pressure in the molten body using an oxygen analyzer, and regulating the oxygen partial pressure within the range of $10^{-14.0}$ (atm) or higher and $10^{-8.0}$ (atm) or lower based on an obtained measurement result,
   the method being devoid of a dephosphorization step of removing phosphorus from the alloy after separating the slag from the molten material and recovering the alloy, wherein the alloy recovered comprises phosphorus in a content of 0.50% by mass or less.

2. The method according to claim 1, wherein the charge further comprises at least one element of tungsten (W) and chromium (Cr).

3. The method according to claim 2, wherein the oxygen partial pressure is regulated within the range of $10^{-14.0}$ (atm) or higher and $10^{-11.0}$ (atm) or lower.

4. The method according to claim 2, wherein the heating temperature in the heating and melting of the raw material is 1,300° C. or higher and 1,500° C. or lower.

5. The method according to claim 2, wherein the valuable metal comprises at least one metal selected from the group consisting of copper (Cu), nickel (Ni), cobalt (Co) and a combination thereof, or an alloy comprising at least one metal selected from the group consisting of copper (Cu), nickel (Ni), cobalt (Co) and a combination thereof.

6. The method according to claim 2, the charge comprises a discarded lithium ion battery.

7. The method according to claim 1, wherein the oxygen partial pressure is regulated within the range of $10^{-14.0}$ (atm) or higher and $10^{-11.0}$ (atm) or lower.

8. The method according to claim 7, wherein the heating temperature in the heating and melting of the raw material is 1,300° C. or higher and 1,500° C. or lower.

9. The method according to claim 7, wherein the valuable metal comprises at least one metal selected from the group consisting of copper (Cu), nickel (Ni), cobalt (Co) and a combination thereof, or an alloy comprising at least one metal selected from the group consisting of copper (Cu), nickel (Ni), cobalt (Co) and a combination thereof.

10. The method according to claim 7, the charge comprises a discarded lithium ion battery.

11. The method according to claim 1, wherein the heating temperature in the heating and melting of the raw material is 1,300° C. or higher and 1,500° C. or lower.

12. The method according to claim 11, wherein the valuable metal comprises at least one metal selected from the group consisting of copper (Cu), nickel (Ni), cobalt (Co) and a combination thereof, or an alloy comprising at least one metal selected from the group consisting of copper (Cu), nickel (Ni), cobalt (Co) and a combination thereof.

13. The method according to claim 1, wherein the valuable metal comprises at least one metal selected from the group consisting of copper (Cu), nickel (Ni), cobalt (Co) and a combination thereof, or an alloy comprising at least one metal selected from the group consisting of copper (Cu), nickel (Ni), cobalt (Co) and a combination thereof.

14. The method according to claim 1, the charge comprises a discarded lithium ion battery.

* * * * *